United States Patent
Yuuki et al.

(10) Patent No.: US 7,417,818 B2
(45) Date of Patent: Aug. 26, 2008

(54) MAGNETIC RECORDING DEVICE

(75) Inventors: Fumio Yuuki, Fujimino (JP); Hiroki Yamashita, Hachioji (JP); Masayoshi Yagyu, Hanno (JP); Tatsuya Kawashimo, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 390 days.

(21) Appl. No.: 11/342,828

(22) Filed: Jan. 31, 2006

(65) Prior Publication Data

US 2006/0203372 A1    Sep. 14, 2006

(30) Foreign Application Priority Data

Mar. 11, 2005    (JP) .............. 2005-068838

(51) Int. Cl.
    *G11B 5/02* (2006.01)
(52) U.S. Cl. ............................ 360/68; 360/46
(58) Field of Classification Search .................. None
    See application file for complete search history.

(56) References Cited

U.S. PATENT DOCUMENTS 6,798,597 B1 *   9/2004   Aram et al. ................ 360/68

2005/0254159 A1 * 11/2005  Venca et al. ................ 360/68

FOREIGN PATENT DOCUMENTS

| JP | 2001-020601 | * | 7/2001 |
| JP | 2001-202601 |   | 7/2001 |
| JP | 2005-267700 |   | 9/2005 |
| JP | 2005-269336 |   | 9/2005 |

* cited by examiner

*Primary Examiner*—Andrea Wellington
*Assistant Examiner*—Varsha A. Kapadia
(74) *Attorney, Agent, or Firm*—Mattingly, Stanger, Malur & Brundidge, PC

(57) ABSTRACT

A magnetic recording device capable of reducing the size of a writing circuit and the power consumption by readily adjusting the overshoot of the write current pulses is provided. Two or more transmission lines having different characteristic impedances are provided between an output driver having an impedance $Z_s$ and a magnetic head, the transmission lines are formed so that the characteristic impedances $Z_1$, $Z_{n-1}$, and $Z_n$ ($n \geq 2$) thereof on the output driver side are higher than those on the magnetic recording head side ($Z_1 > Z_{n-1} > Z_n$), and the impedance $Z_s$ of the output driver is equal to or higher than the characteristic impedance $Z_1$ of the transmission line.

9 Claims, 14 Drawing Sheets

MAGNETIC RECORDING DEVICE

CROSS-REFERENCE TO RELATED APPLICATION

The present application claims priority from Japanese Patent Application No. JP 2005-68838 filed on Mar. 11, 2005, the content of which is hereby incorporated by reference into this application.

TECHNICAL FIELD OF THE INVENTION

The present invention relates to a magnetic recording device. In particular, it relates to a technology effectively applied to a magnetic recording device including a writing circuit composed of a read/write IC for recording and reproduction and a magnetic head, which are connected via transmission lines.

BACKGROUND OF THE INVENTION

According to the study by the inventors of the present invention, the following technologies are known as data writing technologies of magnetic recording devices.

For example, Japanese Patent Application Laid-Open Publication No. 2001-202601 (Patent Document 1) discloses the structure in which the relation among an output impedance Zout of a writer for outputting a write current, a characteristic impedance Zo of a transmission line, and a resistance value Rh of a recording head is Zout>Zo>Rh. By virtue of such relation of the impedances, the rise time of the write current in the recording head can be shortened, and the current settling time until the write current reaches a stable level can be shortened. Therefore, high-speed transfer can be performed.

SUMMARY OF THE INVENTION

Meanwhile, as a result of the study carried out by the inventors of the present invention, the following facts have been found in relation to data writing technologies of magnetic recording devices as described above.

First, an example of a structure of a standard writing circuit of the magnetic recording device is shown in FIG. 14. The magnetic recording device shown in FIG. 14 is composed of a read/write IC 140, transmission lines 141 having a characteristic impedance $Z_0$, and a magnetic head 142. The read/write IC 140 includes an output driver 140a having an output impedance $Z_s$. When data write is to be performed, write current pulses generated by the output driver 140a are applied to the magnetic head 142 via the transmission lines 141.

Moreover, the output impedance $Z_s$ of the output driver 140a and the characteristic impedance $Z_0$ of the transmission lines 141 are usually designed to be equal to each other. Therefore, the waveform of the current pulses applied to the magnetic head 142 is a matching waveform not including reflection, ringing, and the like, regardless of the value of an impedance $Z_L$ of the magnetic head 142.

In such a magnetic recording device, the output driver 140a sometimes generates write current pulses to which overshoot is intentionally applied as shown in FIG. 15. FIG. 15A and FIG. 15B are waveform diagrams showing examples of operations in the magnetic recording device of FIG. 14, wherein FIG. 15A is a waveform diagram of an output current of the read/write IC and FIG. 15B is a waveform diagram of an input current to the magnetic head.

In FIG. 15A, the output driver 140a of the read/write IC 140 generates current pulses to which overshoot is applied, and as shown in FIG. 15B, similar current pulses are applied also to the magnetic head 142. The overshoot is applied in this manner in order to shorten the rise and fall time of the current pulses so as to speed up the operation.

However, mobile devices and the like (for example, audio players) mounted with magnetic recording devices (for example, hard disk drives) have been developing in recent years, and further downsizing and reduction in power consumption have been required. Under such circumstances, providing a circuit for applying overshoot in the read/write IC 140 leads to the increase in circuit area and the increase in power consumption in the read/write IC 140.

Therefore, in order to solve such problems, for example, technologies shown in Patent Document 1 can be used. In the technologies shown in Patent Document 1, the structure in which the relation $Z_s > Z_0 > Z_L$ is maintained in FIG. 14 is used, and the overshoot is formed by a positive reflection coefficient when viewed from the transmission line 141 side to the magnetic head 142 side and a negative reflection coefficient when viewed from the transmission line 141 side to the read/write IC 140 side.

In this case, in order to adjust the overshoot waveform, both the impedance $Z_s$ of the read/write IC 140 and the impedance $Z_0$ of the transmission line 141 have to be strictly adjusted. However, in practice, the impedances cannot be readily adjusted due to the presence of connecting parts such as bonding between the read/write IC 140 and the transmission line 141. Moreover, since a circuit for accurately adjusting the output impedance $Z_s$ is also required in the read/write IC 140, the circuit area could be increased.

Therefore, an object of the present invention is to provide a magnetic recording device which can readily adjust the overshoot of write current pulses. In addition, another object of the present invention is to realize the reduction in area and power consumption of a writing circuit in a magnetic recording device.

The above and other objects and novel characteristics of the present invention will be apparent from the description of this specification and the accompanying drawings.

The typical ones of the inventions disclosed in this application will be briefly described as follows.

A magnetic recording device according to the present invention comprises: a magnetic head for writing data to a magnetic disk; an output driver for supplying a write current to the magnetic head; and a transmission line connecting the magnetic head and the output driver. In this magnetic recoding device, the transmission line has two or more characteristic impedances in a length direction of the transmission line, and is formed so that the characteristic impedance on the output driver side is higher than the characteristic impedance on the magnetic head side. Also, an impedance value of the output driver is set to be equal to or higher than a characteristic impedance value at an end of the transmission line on the output driver side.

More specifically, an equivalent circuit thereof has a plurality of transmission lines connected in series between an output driver having an impedance $Z_s$ and a magnetic head, and when the characteristic impedances of the transmission lines sequentially from the output driver side to the magnetic head side are $Z_1, \ldots, Z_n$ ($n \geq 2$), the relation of $Z_{n-1} > Z_n$ and $Z_s \geq Z_1$ is satisfied.

When such a structure is employed, the overshoot can be readily generated with respect to a write current to the magnetic head by virtue of the relation of the characteristic impedances in the transmission lines. Moreover, accurate adjustment of overshoot waveforms can be readily carried out since the overshoot is generated by the setting of the characteristic impedances in the transmission lines.

Moreover, for example, in the structure in which $Z_s=Z_1$ and $n=2$, the current settling time until the overshoot is finished can be adjusted by the length of the transmission line having the characteristic impedance $Z_2$. Furthermore, reduction in area and power consumption can be realized since a circuit for generating overshoot and a circuit for finely adjusting the output impedance are not required in the output driver.

Moreover, the magnetic recording device of the present invention includes a suspension, and a connecting part of a magnetic head, a connecting part of an output driver for supplying a write current to the magnetic head, and a transmission line connecting the connecting part of the magnetic head and the connecting part of the output driver are provided in this suspension. In addition, the transmission line has two or more characteristic impedances with respect to the length direction thereof and is formed so that the characteristic impedance on the side of the connecting part of the output driver becomes higher than that on the side of the connecting part of the magnetic head.

When the structure as described above is employed, a plurality of characteristic impedances can be readily and accurately provided in the transmission line by adjusting the wire width or wire thickness of the transmission line provided in the suspension or the thickness of a dielectric substance which is in a lower part of the wire. Consequently, the overshoot can be generated to the write current to the magnetic head.

The effects obtained by typical aspects of the present invention will be briefly described below. The overshoot of write current pulses can be readily adjusted. In addition, reduction in area and power consumption of a writing circuit in a magnetic recording device can be realized.

BRIEF DESCRIPTIONS OF THE DRAWINGS

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

Figure 1:
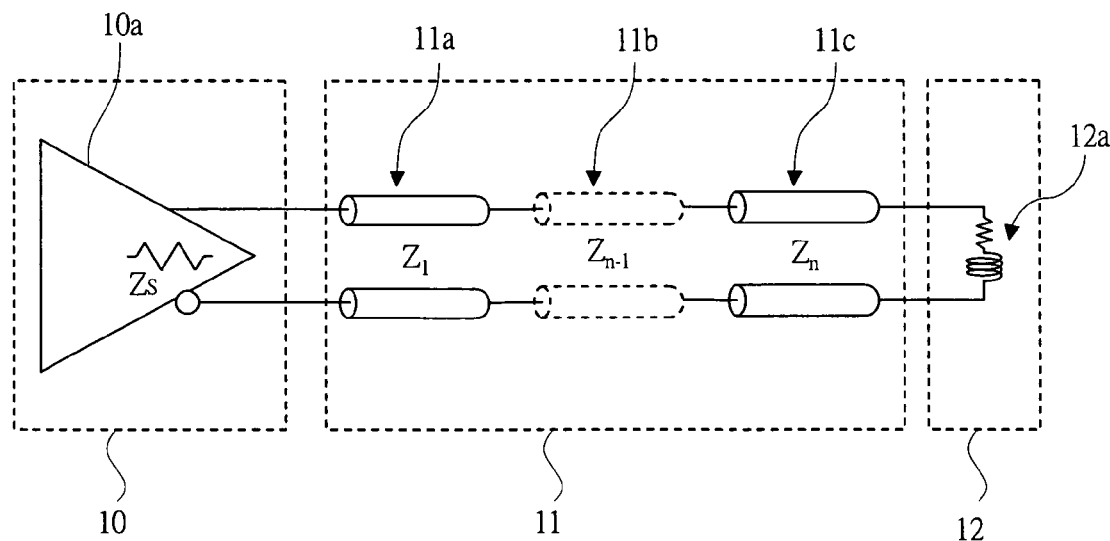
FIG. 1 is a schematic diagram showing an example of the structure of a magnetic recording device according to an embodiment of the present invention.

FIG. 1 is a schematic diagram showing an example of the structure of a magnetic recording device according to an embodiment of the present invention. The magnetic recording device shown in FIG. 1 is provided with a read/write IC 10, a magnetic head 12, and transmission lines 11 provided therebetween.

The read/write IC 10 includes an output driver 10a having an output impedance $Z_s$. The output driver 10a is, for example, a differential output driver, and when information is to be written, it outputs complementary current signals to the magnetic head 12 via the complementary transmission lines 11. Note that the read/write IC 10 also includes a circuit for reproduction (read out) and others though not shown in FIG. 1.

Both ends of the magnetic head 12 are connected to the above-described complementary transmission lines 11, magnetic flux is generated when the current signals from the read/write IC 10 flow through an electromagnetic coil, and a write to an magnetic disk (not shown) is carried out by the magnetic flux. Note that, in the magnetic head 12 shown in FIG. 1, only a recording head (magnetic recording head) 12a for writing is shown, and illustration of a reproduction head for read-out composed of a GMR element (magnetoresistive element) or the like is omitted.

The transmission line 11 has the structure provided with a plurality of, that is, two or more characteristic impedances in the length direction thereof. More specifically, as shown in FIG. 1, an equivalent circuit thereof has a structure in which a transmission line 11a having a characteristic impedance $Z_1$, a transmission line 11b having a characteristic impedance $Z_{n-1}$, and a transmission line 11c having a characteristic impedance $Z_n$ are connected in series in the direction from the output driver 10a side to the magnetic recording head 12a side. Note that n is an integer of two or more.

The present invention is characterized in that, in such a structure, the characteristic impedances of the transmission line 11 are formed so that the impedance on the output driver 10a side is higher than that on the magnetic recording head 12a side, and the output impedance $Z_s$ of the output driver 10a has a value equal to or higher than that of the characteristic impedance at the end of the transmission line 11 on the output driver 10a side. In other words, the relation of $Z_1 > Z_{n-1} > Z_n$ and $Z_s \geq Z_1$ is satisfied.

Figure 2:
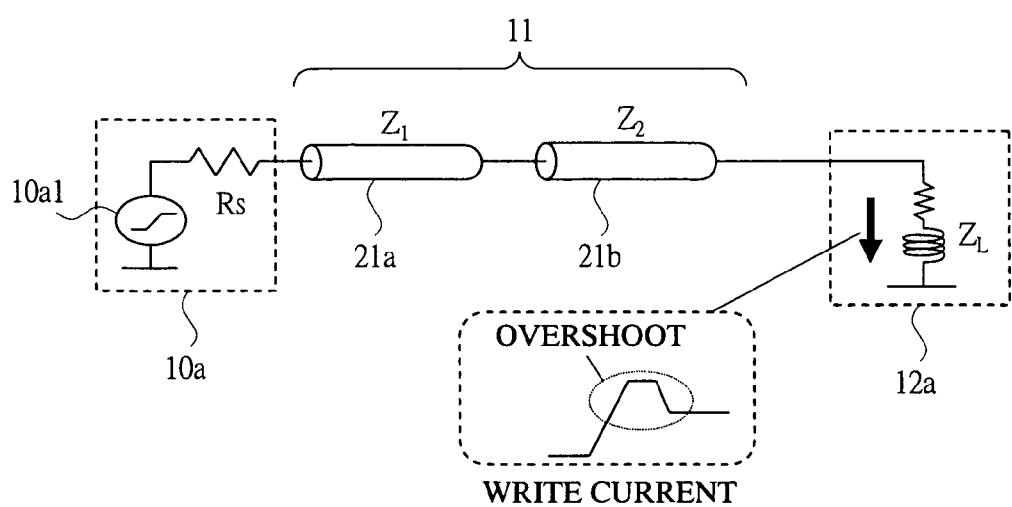
FIG. 2 is a diagram showing an example of an equivalent circuit of the magnetic recording device of FIG. 1.
Figure 3:
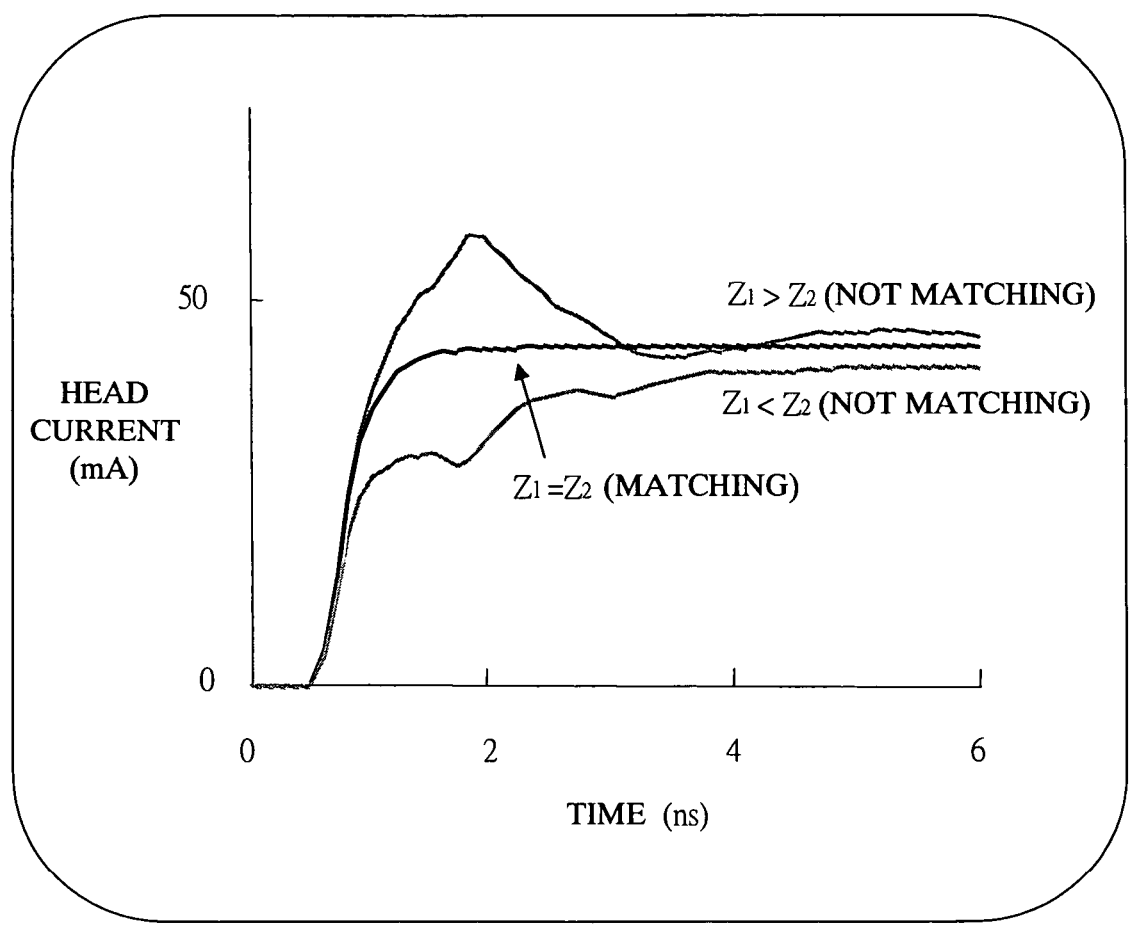
FIG. 3 is a diagram for describing operations of the equivalent circuit of FIG. 2.

Next, operations of the magnetic recording device of FIG. 1 will be described with reference to an equivalent circuit. FIG. 2 is a diagram showing an example of an equivalent circuit of the magnetic recording device of FIG. 1. FIG. 3 is a diagram for describing the operations of the equivalent circuit of FIG. 2.

In the equivalent circuit shown in FIG. 2, the output driver 10a is represented by a waveform generator 10a1 and an output resistance $R_s$ which is connected thereto in series, and the magnetic recording head 12a is represented by a series circuit of an inductance component of the electromagnetic coil and a resistance component. Also, the transmission line 11 of FIG. 2 shows the case where n=2 in FIG. 1, and the circuit in which a transmission line 21a of a characteristic impedance $Z_1$ and a transmission line 21b of a characteristic impedance $Z_2$ are connected sequentially from the output driver 10a side is formed. Further, the relation of the impedances are, as described above, represented by $R_s \geq Z_1$ and $Z_1 > Z_2$. It should be noted that, although there is no particular regulation for an impedance $Z_L$ of the magnetic recording head 12a, the relation will be $Z_2 > Z_L$ since the value of $Z_L$ normally becomes small.

The case where the output resistance $R_s$ of the output driver 10a is equal to $Z_1$ and a positive step current waveform is outputted from the waveform generator 10a1 is assumed here. As shown in FIG. 3, if $Z_1 = Z_2$, the impedances in the transmission line 11 are matching. Therefore, a matching current waveform is inputted to the magnetic recording head 12a.

Meanwhile, if $Z_1 > Z_2$, a positive reflected current generated in the magnetic recording head 12a returns to the magnetic recording head 12a as a negative reflected current because of a negative reflection coefficient when viewed from the transmission line 21b side to the transmission line 21a side. Therefore, a current waveform including overshoot is inputted to the magnetic recording head 12a. On the other hand, if $Z_1 < Z_2$, a positive reflected current generated in the magnetic recording head 12a returns to the magnetic recording head 12a as a positive reflected current because of a positive reflection coefficient when viewed from the transmission line 21b side to the transmission line 21a side. Therefore, the waveform in the magnetic recording head 12a becomes a step-like current waveform in which the current is gradually increased.

Therefore, when the transmission line 11 is configured so as to satisfy $Z_1 > Z_2$, the overshoot can be formed in the magnetic recording head 12a by virtue of the current reflection in the transmission line 11. Although an example in which the transmission line 11 is divided into two has been described here, the overshoot can be similarly formed in the current waveform in the magnetic recording head 12a also in the case where the line is divided into three or more as long as the characteristic impedance of the transmission line 11 on the output driver 10a side is made higher than the characteristic impedance of the transmission line 11 on the magnetic recording head 12a side.

Figure 4A:
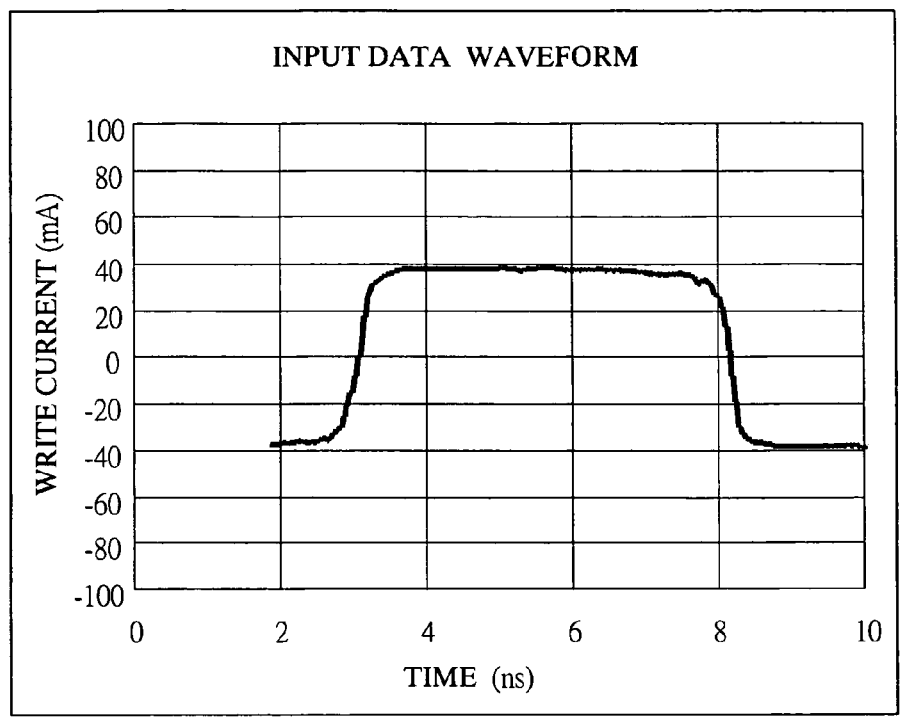
FIG. 4A is a waveform diagram showing an example of an output current waveform of a waveform generator in the equivalent circuit of FIG. 2.
Figure 4B:
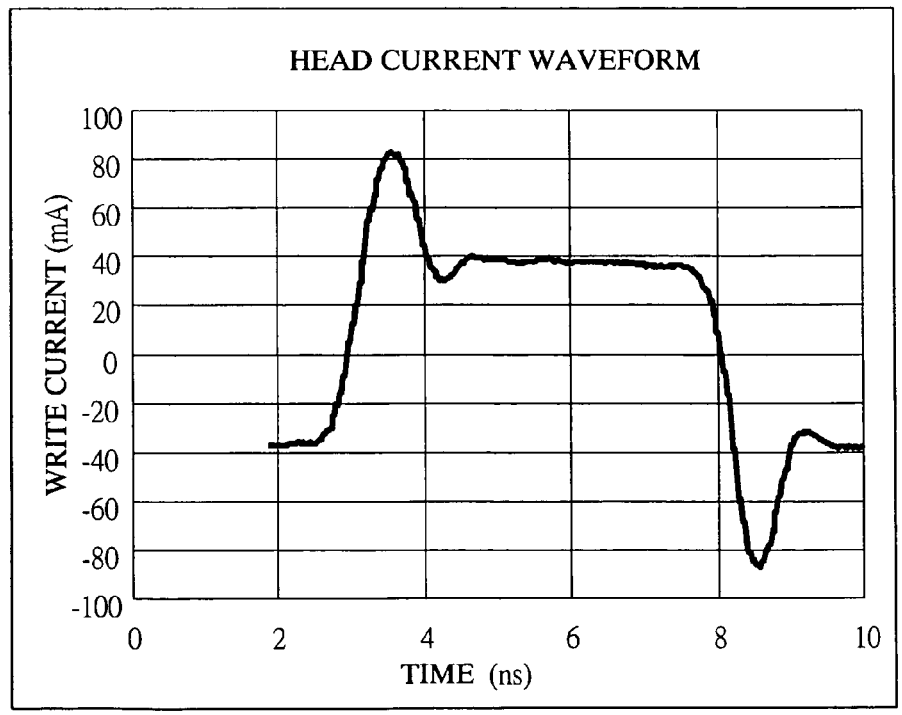
FIG. 4B is a waveform diagram showing an example of an input current waveform to a magnetic recording head in the equivalent circuit of FIG. 2.

FIG. 4A and FIG. 4B are waveform diagrams showing examples of current waveforms in respective parts in the equivalent circuit of FIG. 2, wherein FIG. 4A shows an output current waveform of the waveform generator and FIG. 4B shows an input current waveform of the magnetic recording head. When a write current pulse is inputted from the waveform generator 10a1 toward the magnetic recording head 12a as shown in FIG. 4A, current reflection occurs in the transmission line 11. Accordingly, the overshoot is formed in the magnetic recording head 12a as shown in FIG. 4B. Consequently, the time for switching the write current (rise and fall time of the current waveform) is shortened, and the writing speed can be increased. It should be noted that, when a write current pulse including overshoot such as that described above in "Summary of the Invention" is outputted by the read/write IC 10, a further larger overshoot is generated in the magnetic head 12.

When the overshoot is formed in the above-described manner by the reflection in the transmission line 11, for example, the following effects can be obtained.

First, since the overshoot is adjusted mainly by the design of the transmission line 11, a desired overshoot waveform (overshoot amount and time) can be readily and accurately adjusted.

More specifically, in a conventional technology such as that described in Patent Document 1, accurate adjustment cannot be readily performed since overshoot waveforms are adjusted at a connecting point (reflection part) of the output driver and the transmission line and actual impedances are changed by the influence of, for example, the bonding or the like of the connecting point. On the other hand, when the present invention is employed, overshoot waveforms can be readily and accurately adjusted since a reflection part is fabricated in the transmission line and uncertain external factors such as the bonding are not applied.

Furthermore, it is also possible to adjust the time of overshoot by adjusting the length of the divided transmission lines. More specifically, in the example of FIG. 2, since the time when a current reciprocates through the transmission line 21b corresponds to the time when the overshoot generates, the time can be varied by the adjustment of the length of the line. Moreover, it is also possible to achieve the speed-up by shortening the length of the transmission line 21b so as to shorten the current settling time until the overshoot is finished.

Secondly, reduction in the circuit area of the read/write IC and power consumption can be realized. More specifically, in conventional technologies such as that described in Patent Document 1, there is the possibility that an impedance adjustment circuit is required in the output driver since fine adjustment of the output impedance is required for accurately adjusting the overshoot amount in practice and in order to manage the transmission systems having different impedance systems. Meanwhile, in the present invention, it is possible to accurately adjust the overshoot by the design of the transmission line and also to manage the transmission systems having different impedance systems without such an impedance adjustment circuit. Therefore, the circuit area can be reduced. Furthermore, the circuit area can be reduced and the power consumption can be saved since it is unnecessary to provide the circuit for generating overshoot in the read/write IC.

Note that, although the case where $R_s=Z_1$ has been described here, the overshoot can be certainly formed also in the case where $R_s>Z_1$. In this case, the overshoot is formed by using both the reflection part set in the transmission line and the connecting point of the transmission line and the output driver.

Figure 5A:
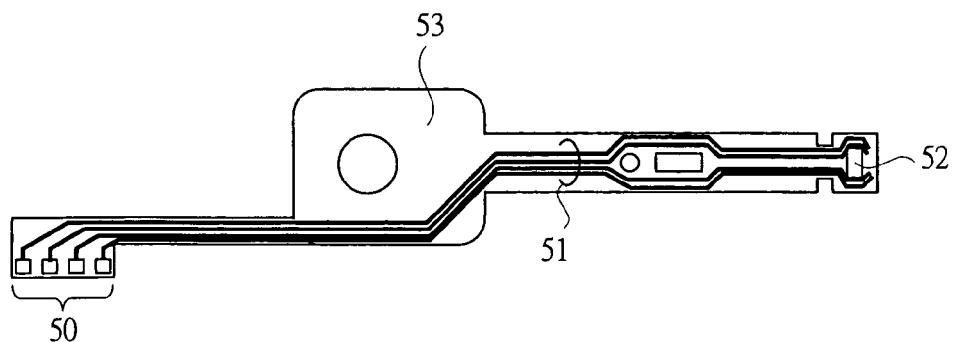
FIG. 5A is a plan view showing an example of a suspension having the transmission lines in the magnetic recording device of FIG. 1.
Figure 5B:
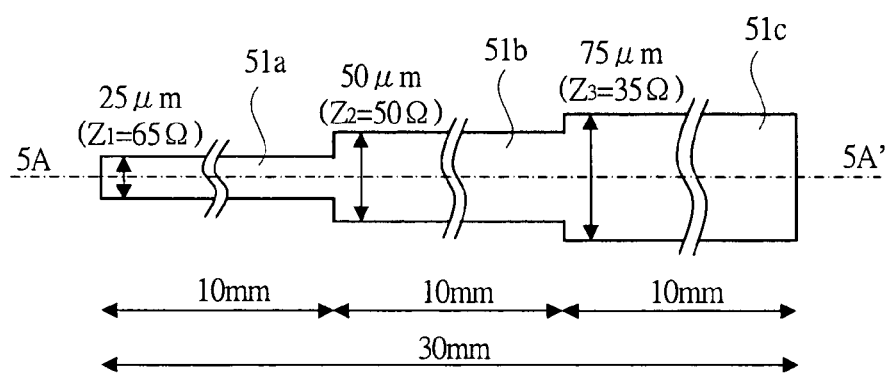
FIG. 5B is a plan view showing an example of detailed dimensions of each of the transmission lines of FIG. 5A.
Figure 5C:
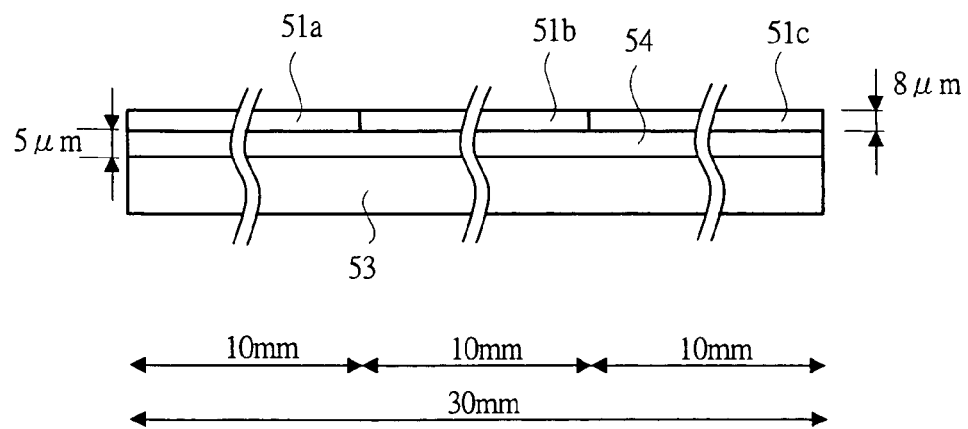
FIG. 5C is a cross-sectional view taken along the line 5A-5A' of FIG. 5B.
Figure 6A:
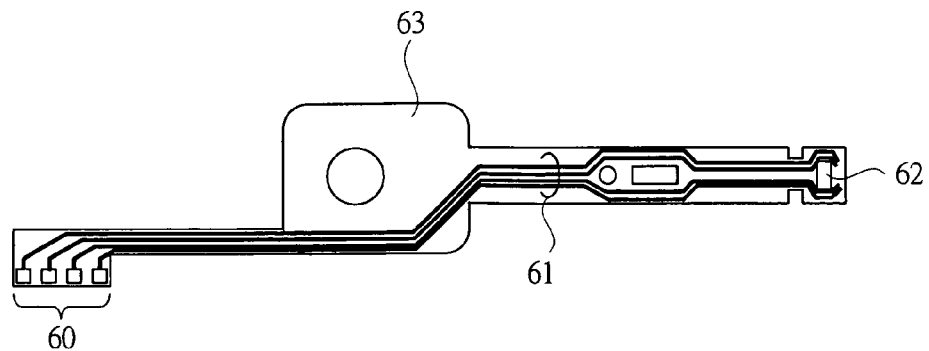
FIG. 6A is a plan view showing another example of a suspension having the transmission lines in the magnetic recording device of FIG. 1.
Figure 6B:
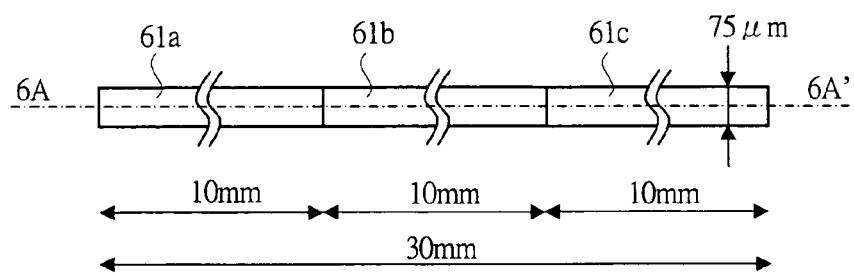
FIG. 6B is a plan view showing an example of detailed dimensions of each of the transmission lines of FIG. 6A.
Figure 6C:
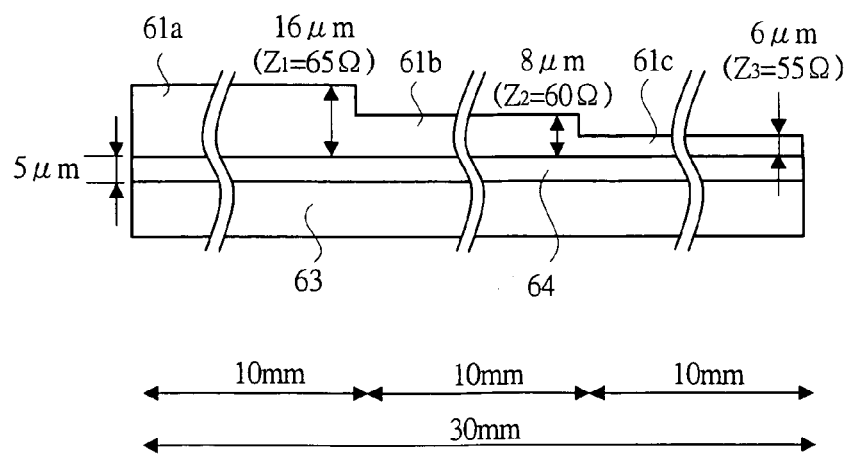
FIG. 6C is a cross-sectional view taken along the line 6A-6A' of FIG. 6B.
Figure 7A:
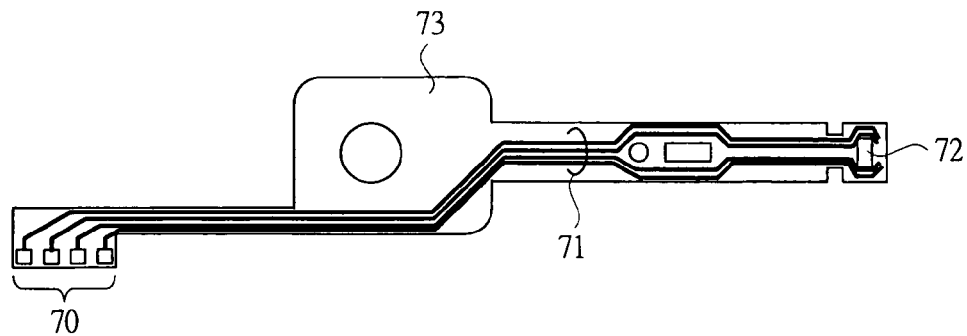
FIG. 7A is a plan view showing still another example of a suspension having the transmission lines in the magnetic recording device of FIG. 1.
Figure 7B:
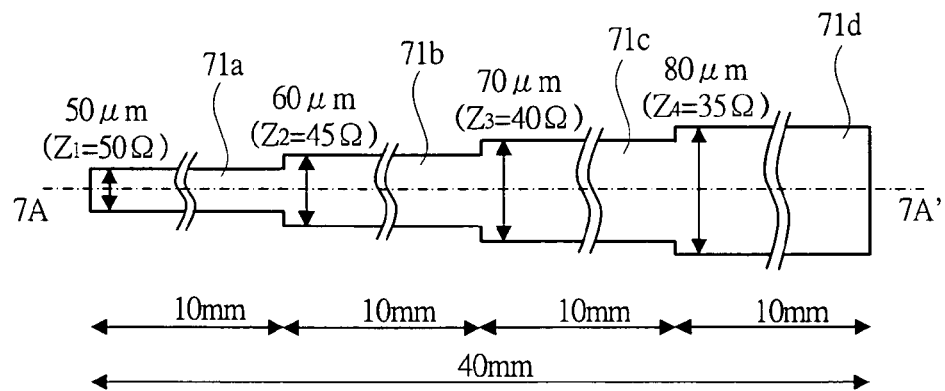
FIG. 7B is a plan view showing an example of detailed dimensions of each of the transmission lines of FIG. 7A.
Figure 7C:
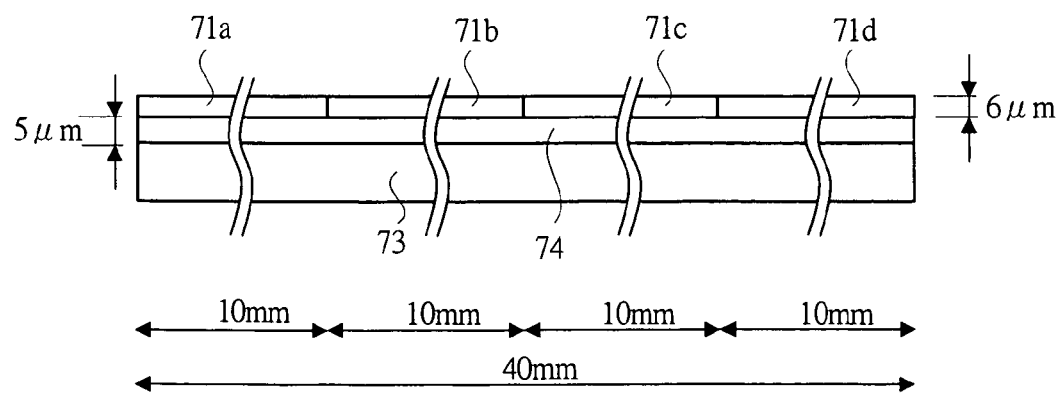
FIG. 7C is a cross-sectional view taken along the line 7A-7A' of FIG. 7B.

Next, detailed examples of a structure of the above-described transmission lines 11 will be described with reference to FIG. 5 to FIG. 7. FIG. 5A to FIG. 5C show an example of the outer shape of the transmission lines in the magnetic recording device of FIG. 1, wherein FIG. 5A is a plan view showing an example of a suspension having the transmission lines, FIG. 5B is a plan view showing an example of detailed dimensions of each of the transmission lines of FIG. 5A, and FIG. 5C is a cross-sectional view taken along the line 5A-5A' of FIG. 5B. FIG. 6A to FIG. 6C show another example of the outer shape of the transmission lines in the magnetic recording device of FIG. 1, wherein FIG. 6A is a plan view showing an example of a suspension having the transmission lines, FIG. 6B is a plan view showing an example of detailed dimensions of each of the transmission lines of FIG. 6A, and FIG. 6C is a cross-sectional view taken along the line 6A-6A' of FIG. 6B. FIG. 7A to FIG. 7C show still another example of the outer shape of the transmission lines in the magnetic recording device of FIG. 1, wherein FIG. 7A is a plan view showing an example of a suspension having the transmission lines, FIG. 7B is a plan view showing an example of detailed dimensions of each of the transmission lines of FIG. 7A, and FIG. 7C is a cross-sectional view taken along the line 7A-7A' of FIG. 7B.

As shown in FIG. 5A, FIG. 6A, and FIG. 7A, for example, transmission lines 51, 61, and 71 are respectively provided on the parts called suspensions 53, 63, and 73 in hard disk drives. One ends of the transmission lines 51, 61, and 71 are respectively connected to pads 50, 60, and 70 which are respectively provided on the suspension 53, 63, and 73, and the other ends thereof are respectively connected to magnetic head mounting parts 52, 62, and 72 which are respectively provided on the suspensions 53, 63, and 73. The read/write IC 10 is connected to the pads 50, 60, and 70, and the magnetic head 12 is mounted and connected to each of the magnetic head mounting parts 52, 62, and 72.

Each of the suspensions 53, 63, and 73 mainly functions to maintain a constant distance between the magnetic head 12 and a magnetic disk (not shown). Wires such as twisted pair lines have been sometimes used as the transmission lines in the past. However, so-called wireless-type suspensions in which transmission lines are incorporated in suspensions are used in recent years.

When transmission lines are to be incorporated in such a wireless-type suspension, the transmission lines having the dimensions as shown in FIGS. 5B and 5C, FIGS. 6B and 5C, and FIGS. 7B and 7C can be incorporated in accordance with the specifications of the hard disk drive. FIG. 5 and FIG. 6 show the examples of the structure of transmission lines for mobile devices and the like including 2.5-inch hard disk drives.

As shown in FIG. 5B and FIG. 5C, the transmission line 51 shown in FIG. 5 has a three-division structure in which a transmission line 51a, a transmission line 51b, and a transmission line 51c are sequentially provided from the pad 50 toward the magnetic head mounting part 52. Each of the transmission lines 51a, 51b, and 51c has a wire length of 10 mm and a wire thickness of 8 μm and has a thickness of a dielectric substance 54 of 5 μm which is in the lower part of the wire. However, the wire widths thereof are different. In this case, the transmission lines 51a, 51b, and 51c are assumed to have wire widths of 25 μm, 50 μm, and 75 μm, respectively.

Figure 8:
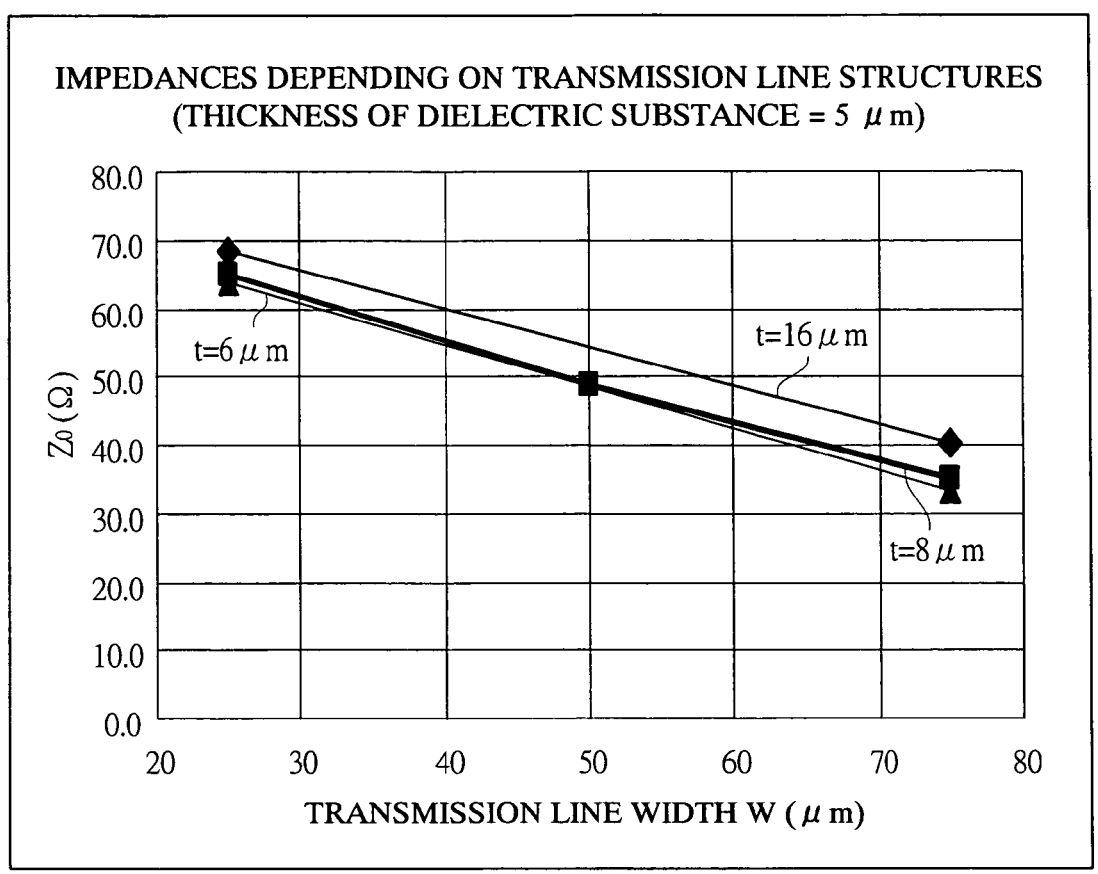
FIG. 8 is a graph showing an example of the relation between the dimensions and the characteristic impedances of the transmission line in the magnetic recording device of FIG. 1.
Figure 9:
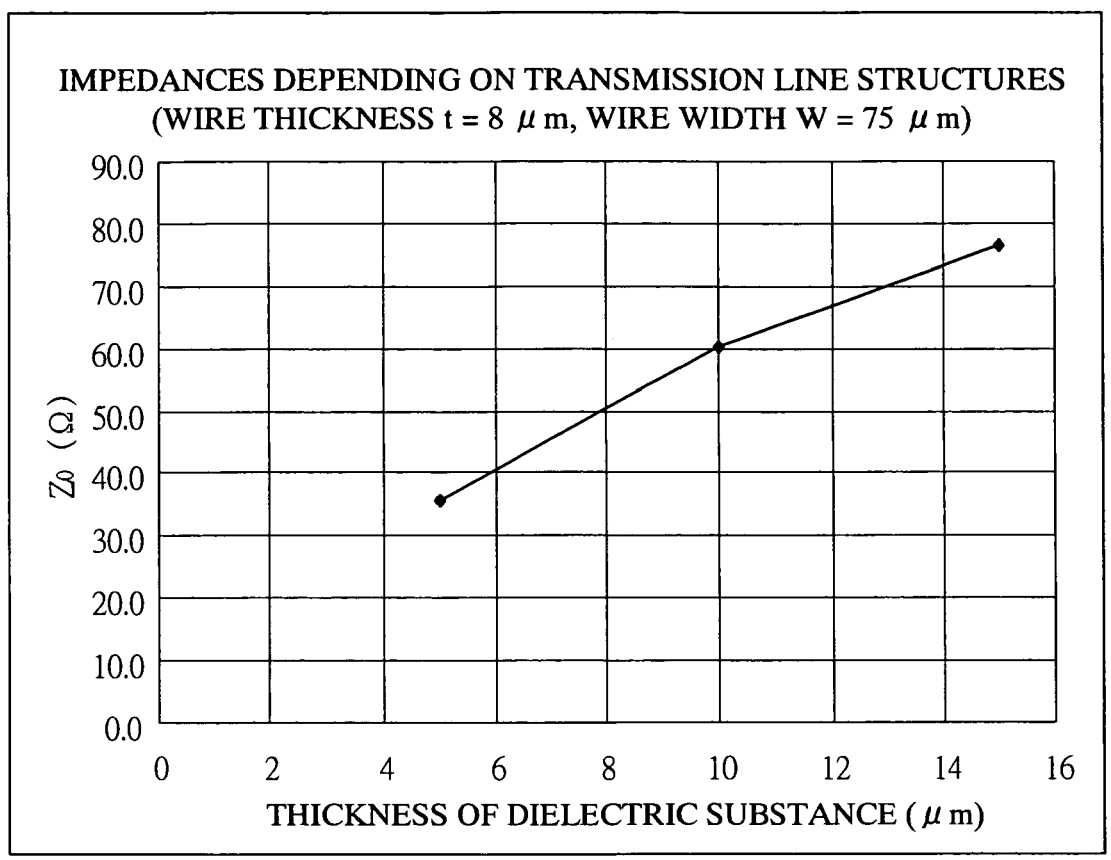
FIG. 9 is a graph showing an example of the relation between the thickness and the characteristic impedances of the dielectric substance in the lower part of the transmission line in the magnetic recording device of FIG. 1.

When the wire widths, wire thicknesses, and the thickness of the dielectric substance are adjusted in the above-described manner, the characteristic impedances of the transmission lines can be accurately and readily adjusted, for example, as shown in FIG. 8 and FIG. 9. FIG. 8 is a graph showing an example of the relation between the dimensions and the characteristic impedances of the transmission line in the magnetic recording device of FIG. 1. FIG. 9 is a graph showing an example of the relation between the thickness of the dielectric substance in the lower part of the transmission line and the characteristic impedances in the magnetic recording device of FIG. 1.

FIG. 8 shows variations in the characteristic impedances in the case where the thickness of the dielectric substance has a fixed value (5 μm), the transmission line has three types of the thickness t (t=16 μm, 8 μm, and 6 μm), and the width W of each of the transmission lines is changed. FIG. 9 shows variations in the characteristic impedances in the case where both the thickness t and the width W of the transmission line have fixed values (t=8 μm and W=75 μm) and the thickness of the dielectric substance is changed. According to FIG. 8, the characteristic impedances $Z_1$, $Z_2$, and $Z_3$ of the transmission lines 51a, 51b, and 51c shown in FIG. 5 are 65 Ω, 50 Ω, and 35 Ω, respectively.

Also, similar to that shown in FIG. 5, the transmission line 61 shown in FIG. 6 has a three division structure, in which a transmission line 61a, a transmission line 61b, and a transmission line 61c are sequentially provided from the pad 60 toward the magnetic head mounting part 62. Each of the transmission lines 61a, 61b, and 61c has a wire length of 10 mm, a wire width of 75 μm, and a thickness of a dielectric substance 64 of 5 μm which is in the lower part of the wire. However, different from FIG. 5, the wire thicknesses thereof are different. In this case, the transmission lines 61a, 61b, and 61c are assumed to have wire thicknesses of 16 μm, 8 μm, and 6 μm, respectively. Therefore, according to FIG. 8, the characteristic impedances $Z_1$, $Z_2$, and $Z_3$ of the transmission lines 61a, 61b, and 61c are 65 Ω, 60 Ω, and 55 Ω, respectively.

FIG. 7A to FIG. 7C show an example of a structure of the transmission lines for server devices and the like including 3.5-inch hard disk drives. The transmission line 71 shown in FIG. 7 has a four division structure in which a transmission line 71a, a transmission line 71b, a transmission line 71c, and a transmission line 71d are sequentially provided from the pad 70 toward the magnetic head mounting part 72. Each of the transmission lines 71a, 71b, 71c, and 71d has a wire length of 10 mm, a wire thickness of 6 μm, and a thickness of a dielectric substance 74 of 5 μm in the lower part of the wire. However, the wire widths thereof are different. In this case, the transmission lines 71a, 71b, 71c, and 71d have wire widths of 50 μm, 60 μm, 70 μm, and 80 μm, respectively. Therefore, according to FIG. 8, the characteristic impedances $Z_1$, $Z_2$, $Z_3$, and $Z_4$ of the transmission lines 71a, 71b, 71c, and 71d are 50 Ω, 45 Ω, 40 Ω, and 35 Ω, respectively.

As described above, transmission lines which generate optimum overshoot in accordance with the types of the transmission system can be readily formed by adjusting the widths or thicknesses of the transmission lines or the thicknesses of the dielectric substances (though not shown here). It should be noted that, although the examples of a structure of the transmission line suitable for various types of the transmission system have been shown in FIG. 5 to FIG. 7, the structures are not limited thereto as a matter of course, and various modifications can be made for the number of divisions of the transmission line and the values of the characteristic impedances thereof within the range that satisfies the above-described conditions of the characteristic impedances.

Figure 10:
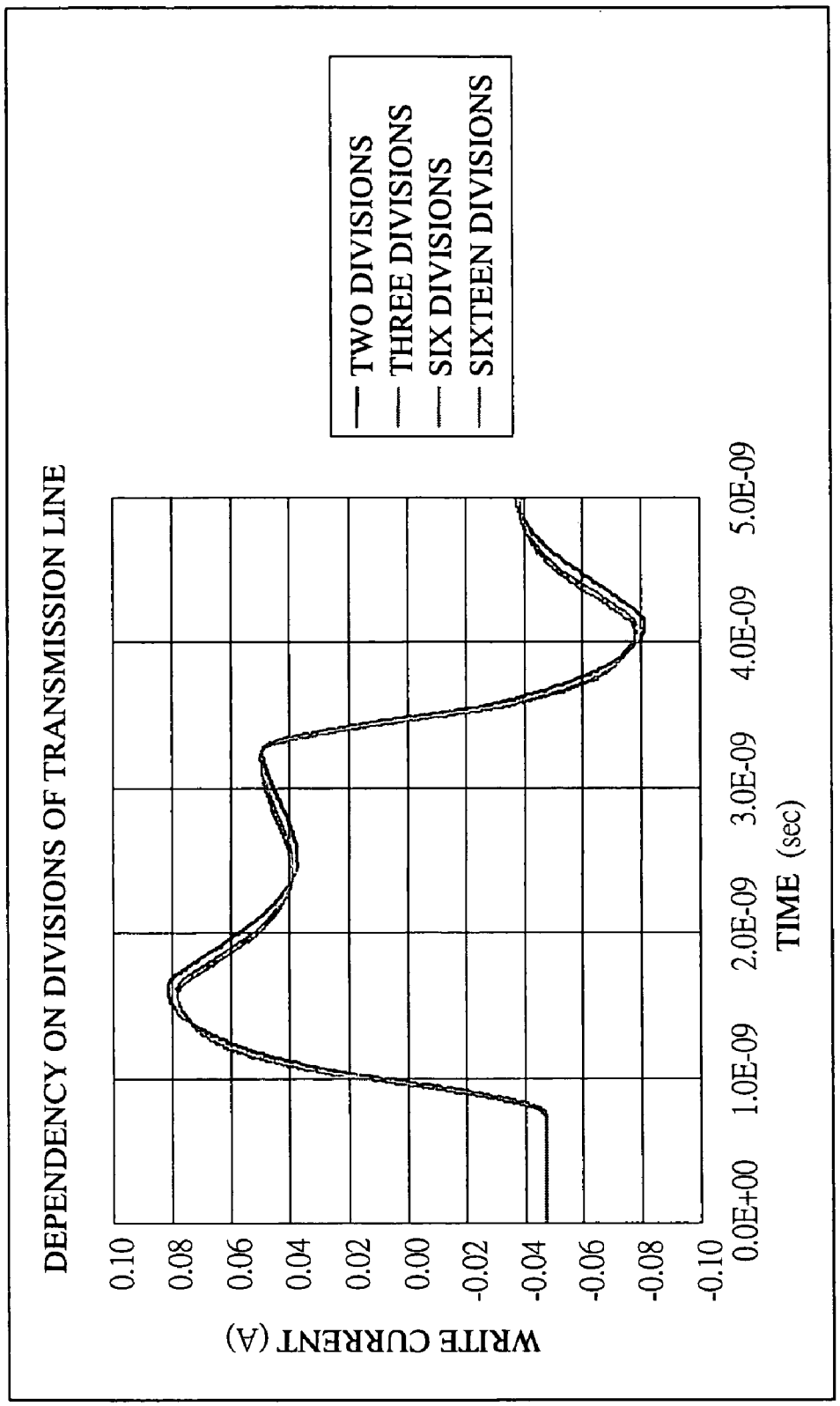
FIG. 10 is a waveform diagram showing the relation between the number of divisions of the transmission line and the input waveforms to the magnetic head in the magnetic recording device of FIG. 1.

FIG. 10 is a waveform diagram showing the relation between the number of divisions of the transmission line and the input waveforms to the magnetic head in the magnetic recording device of FIG. 1. FIG. 10 shows the change in the input waveform in the magnetic head when the number of divisions of the transmission line 11 is changed to two (state where the transmission line 11b is not provided), three, six, and sixteen by modifying the transmission line 11b, under the condition that the characteristic impedance $Z_1$ of the transmission line 11a in FIG. 1 is set to 65 Ω and the characteristic impedance $Z_n$ of the transmission line 11c in FIG. 1 is set to 35 Ω. It goes without saying that, when divided into six and sixteen, the line is divided so that the transmission line on the side close to $Z_1$ has the characteristic impedance higher than that of the transmission line on the side close to $Z_n$. Moreover, the output impedance $Z_s$ of the output driver 10a is 65 Ω, and the impedance of the magnetic head 12 is about 6 Ω.

As is clear from FIG. 10, the input waveforms in the magnetic head are not largely dependent on the number of divisions of the transmission line. Therefore, forming the transmission line divided at least into two in which the values of the characteristic impedance $Z_1$ and the characteristic impedance $Z_n$ are set will do, and further division between $Z_1$ and $Z_n$ can be performed in consideration of, for example, the simplicity of the structural design of the suspension and fine adjustment of the overshoot waveform. In practice, division into two to four is desirable in terms of the design simplicity, etc.

Figure 11:
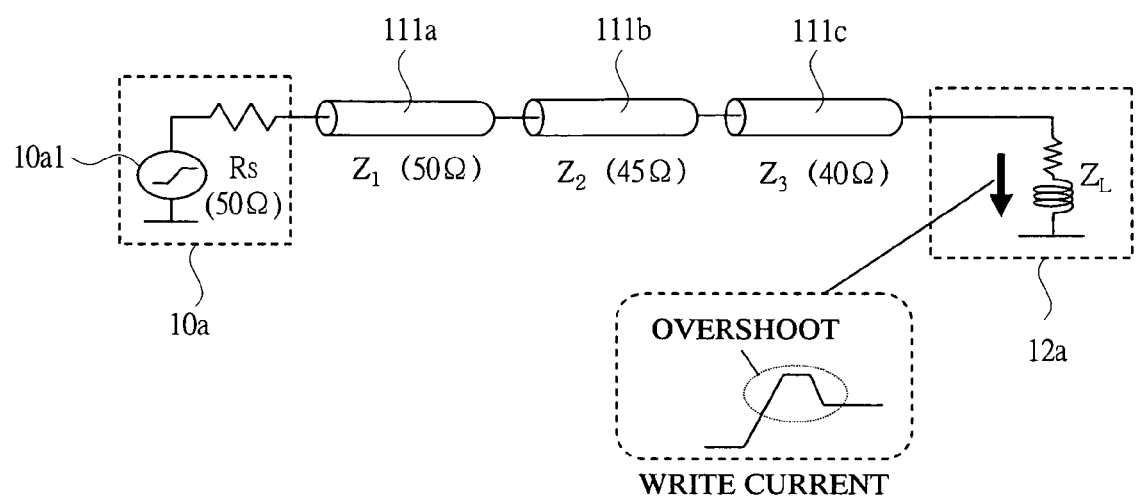
FIG. 11 is an equivalent circuit diagram showing an example of the structure in which the transmission line is divided into three in the magnetic recording device of FIG. 1.
Figures 12A, 12B, 12C:
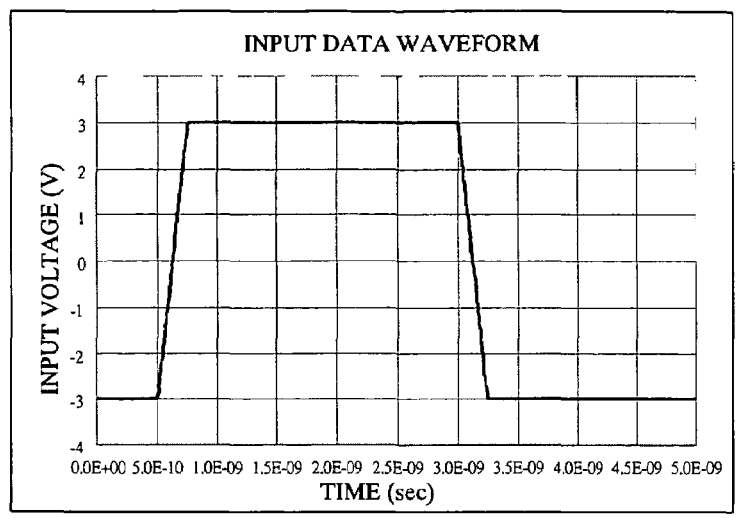
FIG. 12A is a waveform diagram of an output voltage waveform of the waveform generator showing an example of an operation of the magnetic recording device of FIG. 11.
FIG. 12B is a waveform diagram of a current waveform at the output end of the output driver.
FIG. 12C is a waveform diagram of an input current waveform to the magnetic recording head.

FIG. 11 is an equivalent circuit diagram showing an example of the structure in which the transmission line is divided into three in the magnetic recording device of FIG. 1. FIG. 12A to FIG. 12C are waveform diagrams showing an example of an operation of the magnetic recording device of FIG. 11, wherein FIG. 12A shows an output voltage waveform of the waveform generator, FIG. 12B shows a current waveform at the output end of the output driver, and FIG. 12C shows an input current waveform to the magnetic recording head.

In the equivalent circuit shown in FIG. 11, a waveform is outputted from the waveform generator 10a1 representing the output driver 10a via the output resistance $R_s$ (50 Ω), and the output waveform is inputted to the magnetic recording head 12a having the characteristic impedance $Z_L$ via a transmission line 111a having a characteristic impedance $Z_1$ (50 Ω), a transmission line 111b having a characteristic impedance $Z_2$ (45 Ω), and a transmission line 111c having a characteristic impedance $Z_3$ (40 Ω).

In such an equivalent circuit, when a voltage pulse as shown in FIG. 12A is outputted from the waveform generator 10a1, a current waveform as shown in FIG. 12C is inputted to the magnetic recording head 12a. As is clear from FIG. 12C, the input current waveform to the magnetic recording head 12a includes overshoot because, after the first current waveform is inputted to the magnetic recording head 12a, the reflected current generated therein reverses its polarity and is reflected again at the connecting point of the transmission line 111b and the transmission line 111c and the connecting point of the transmission line 111a and the transmission line 111b. Therefore, the rise time and the fall time of the current waveform can be shortened, and it is possible to achieve the speed-up since the current settling time can be also shortened.

Figure 13B:
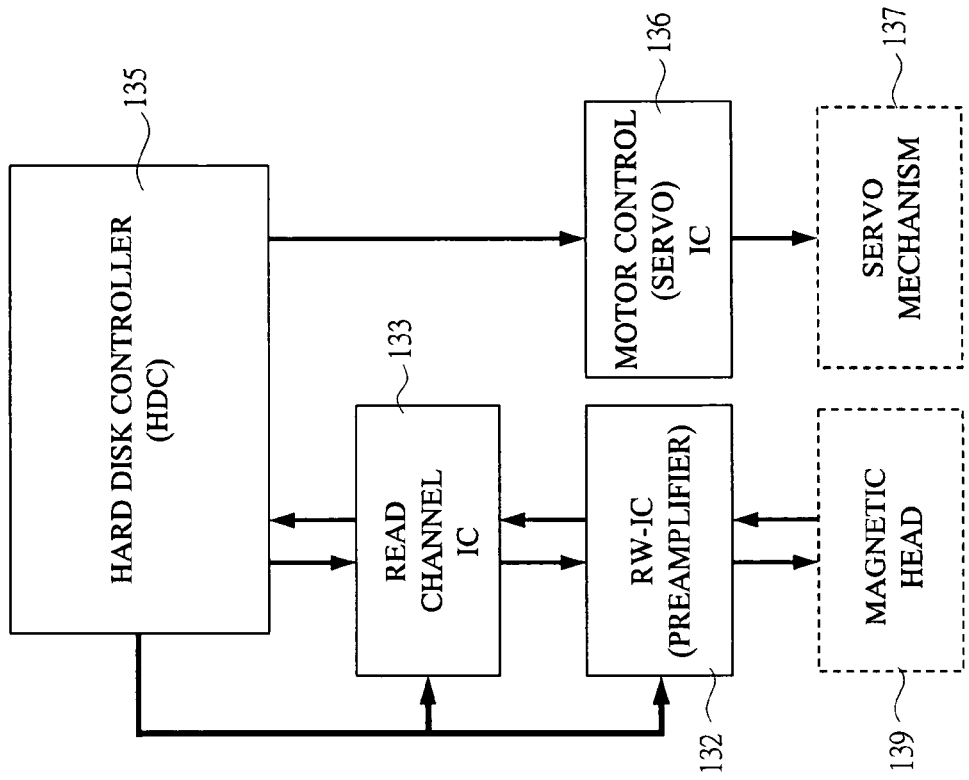
FIG. 13B is a block diagram showing an example of the circuit structure thereof.
Figure 13A:
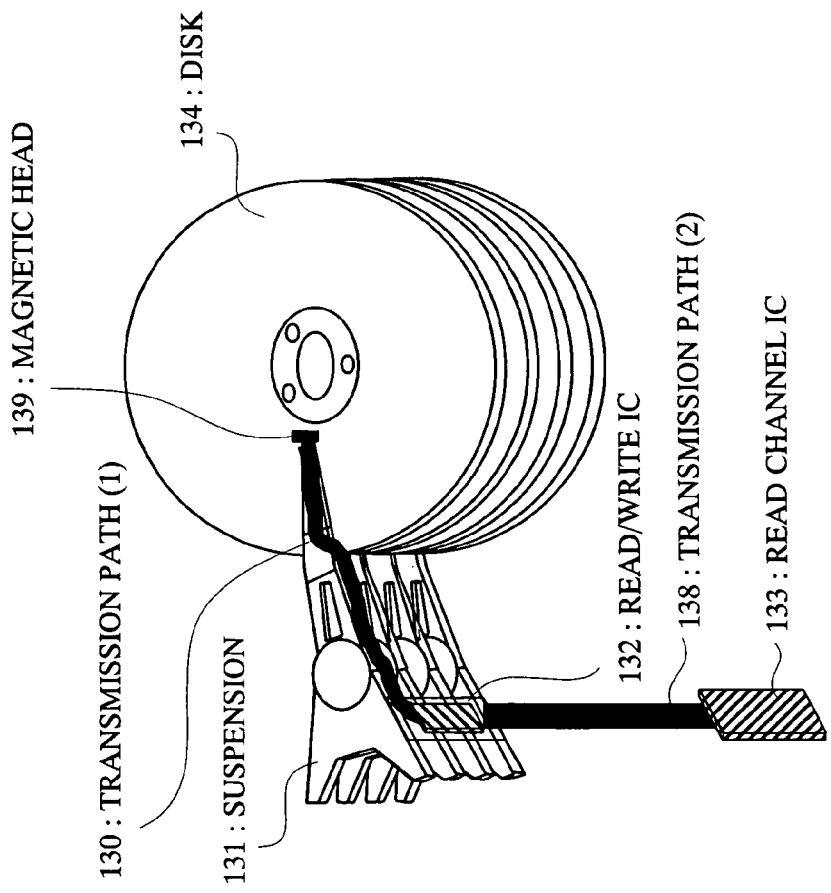
FIG. 13A is a perspective view showing an example of the outer shape of the entire structure of the case where the magnetic recording device of an embodiment of the present invention shown in FIG. 1 is applied to a hard disk drive.
Figure 14:
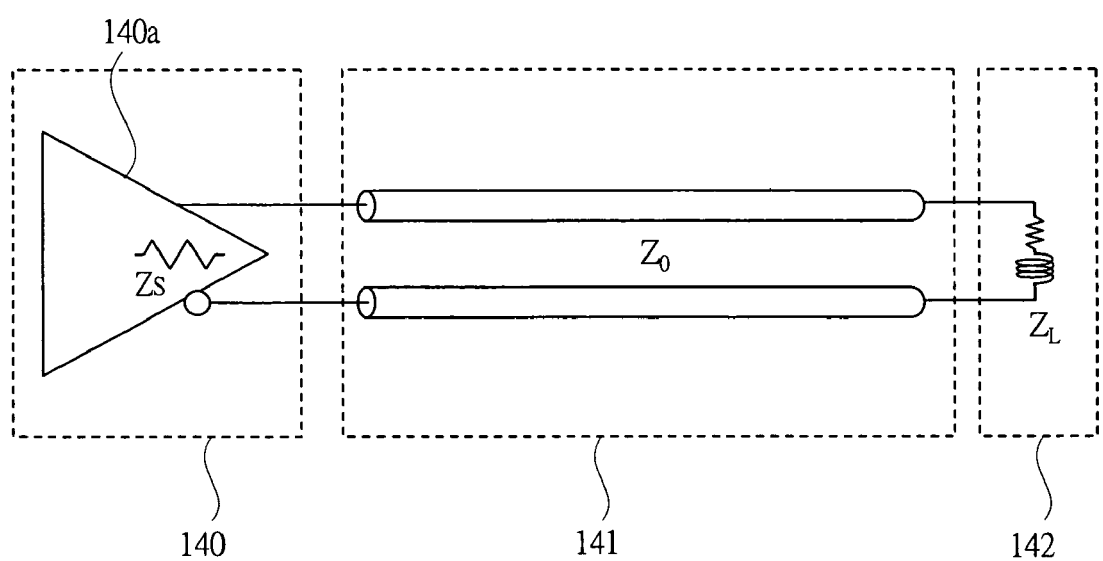
FIG. 14 is a schematic diagram showing an example of the structure of a magnetic recording device according to a conventional technology which has been studied as a premise of the present invention.
Figure 15A:
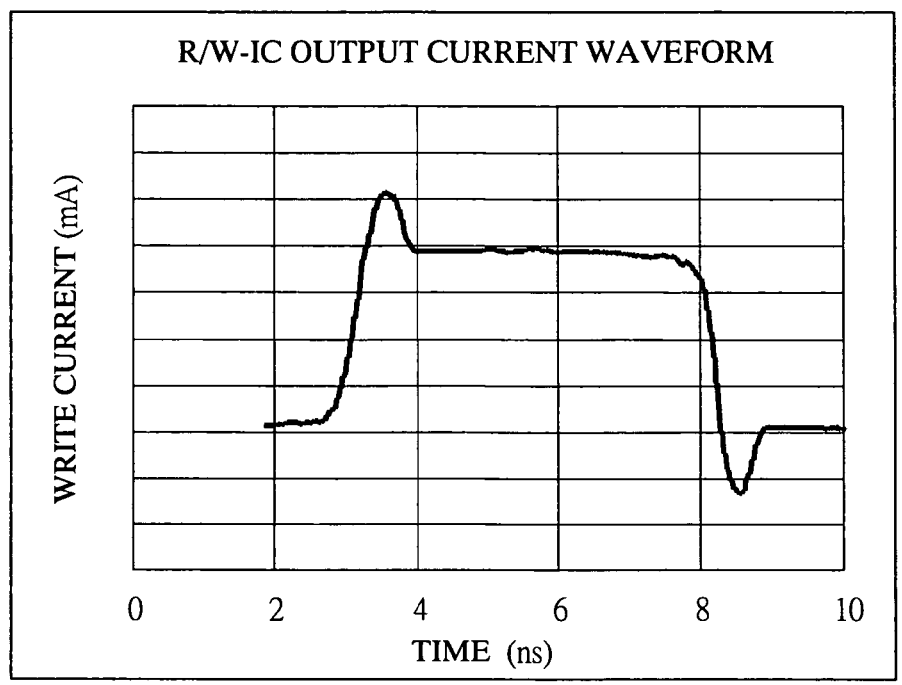
FIG. 15A is a waveform diagram of an output current of the read/write IC showing an example of an operation in the magnetic recording device of FIG. 14.
Figure 15B:
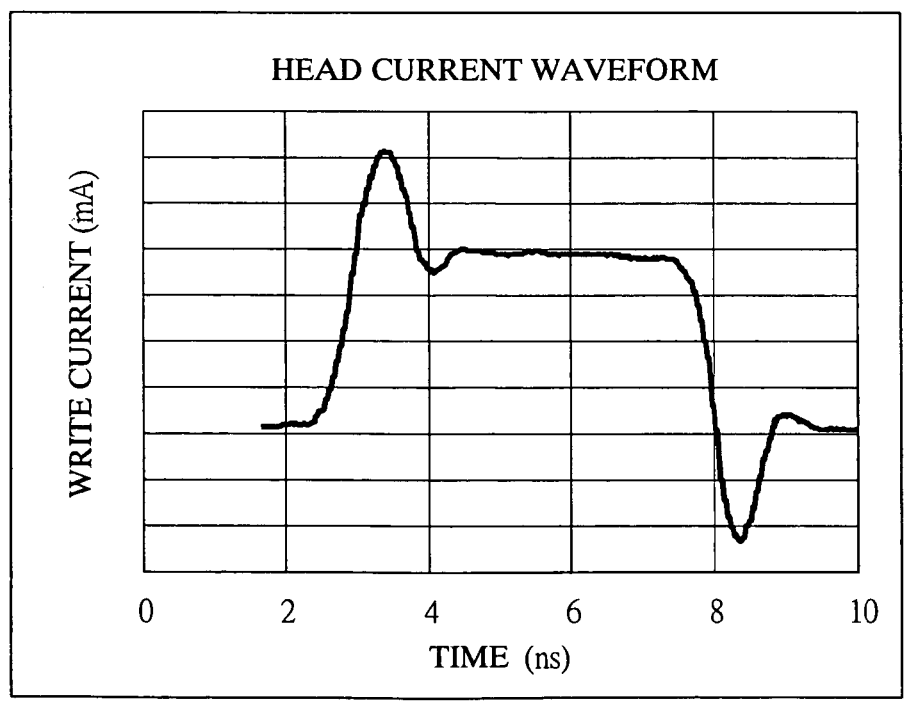
FIG. 15B is a waveform diagram of an input current to the magnetic head showing an example of an operation in the magnetic recording device of FIG. 14.

Incidentally, the magnetic recording device described above is particularly effective when applied to a hard disk drive as shown in FIG. 13. FIG. 13 shows an example of the entire structure of the case where the magnetic recording device of an embodiment of the present invention shown in FIG. 1 is applied to the hard disk drive, wherein FIG. 13A is a perspective view showing an example of the outer shape thereof, and FIG. 13B is a block diagram showing an example of the circuit structure thereof.

The hard disk drive (magnetic recording device) shown in FIG. 13A includes, for example, a magnetic head 139, a read/write IC (preamplifier) 132, a read channel IC 133, a magnetic disk 134, a suspension 131, a transmission path (1) 130 connecting the magnetic head 139 and the read/write IC 132, and a transmission path (2) 138 connecting the read/write IC 132 and the read channel IC 133. The magnetic disk 134 has perpendicular or horizontal magnetic anisotropy, and read-out and write of magnetic data is performed by the magnetic head 139 which is mounted on the suspension 131.

In addition to the magnetic head 139, the read/write IC 132 and others are sometimes mounted on the suspension 131, and the above-described transmission lines are used as the transmission path (1) 130 connecting them. Note that, in addition to the function to maintain a constant distance between the magnetic disk 134 and the magnetic head 139 which has been described with reference to FIG. 5, the suspension 131 has a function to move the magnetic head 139 over the magnetic disk 134 in accordance with the data storage position.

Also, the circuit for controlling such a hard disk drive is configured, for example, as shown in FIG. 13B. A hard disk controller (HDC) 135 forms an interface between the hard disk drive and a host system (personal computer or digital device) and performs transfer control of read/write data and others. The read channel IC 133 performs signal processing such as data modulation/demodulation. The read/write IC 132 and the magnetic head 139 have the functions as described with reference to FIG. 1. A motor control (servo) IC 136 controls servomechanisms 137 such as an operating mechanism of the suspension 131 and a rotating mechanism of the magnetic disk 134.

In recent years, downsizing and reduction in power consumption have been developing in such hard disk drives, and when the read/write IC 132 is to be mounted on the suspension 131, further downsizing is required. In such a case, when the present invention is employed, the read/write IC 132 can be downsized and power consumption thereof can be reduced as described above, and such requirement can be satisfied.

In the foregoing, the invention made by the inventors of the present invention has been concretely described based on the embodiments. However, it is needless to say that the present invention is not limited to the foregoing embodiments and various modifications and alterations can be made within the scope of the present invention.

The magnetic recording device of the present invention is particularly effective when applied to a mobile device mounted with a hard disk drive and the like, in which the reduction in size and power consumption has been demanded.

In addition, it relates to magnetic recording devices in general and can be widely applied as a speed-up technology and a power-consumption saving technology of writing thereof.

What is claimed is:

1. A magnetic recording device comprising:
   a magnetic head for writing data to a magnetic disk;
   an output driver for supplying a write current to said magnetic head; and
   a transmission line connecting said magnetic head and said output driver,
   wherein said transmission line has two or more characteristic impedances in a length direction of said transmission line, and is formed so that the characteristic impedance on the output driver side is higher than the characteristic impedance on the magnetic head side, and
   an impedance value of said output driver is equal to or higher than a characteristic impedance value at an end of said transmission line on the output driver side.

2. The magnetic recording device according to claim 1, wherein the impedance value of said output driver is equal to the characteristic impedance value at the end of said transmission line on the output driver side.

3. The magnetic recording device according to claim 1, wherein said transmission line has two to four characteristic impedances in the length direction of said transmission line.

4. The magnetic recording device according to claim 2, wherein said transmission line comprises:
   a first transmission line connected to said output driver and having a characteristic impedance equal to the impedance of said output driver; and
   a second transmission line connected to said first transmission line and said magnetic head and having a characteristic impedance lower than the characteristic impedance of said first transmission line, and
   a write current waveform supplied to said output driver is adjusted by adjusting the length of said second transmission line.

5. A magnetic recording device comprising a suspension, wherein said suspension is provided with a connecting part of a magnetic head for writing data to a magnetic disk, a connecting part of an output driver for supplying a write current to said magnetic head, and a transmission line connecting said connecting part of the magnetic head and said connecting part of the output driver, and
   said transmission line has two or more characteristic impedances in a length direction of said transmission line, and is formed so that the characteristic impedance on a side of said connecting part of the output driver is higher than the characteristic impedance on a side of said connecting part of the magnetic head.

6. The magnetic recording device according to claim 5, wherein said suspension is further mounted with said output driver in the vicinity of said connecting part of the output driver.

7. The magnetic recording device according to claim 5, wherein said transmission line has a structure in which transmission lines having different wire widths are connected in the length direction of said transmission line.

8. The magnetic recording device according to claim 5, wherein said transmission line has a structure in which transmission lines having different wire thicknesses are connected in the length direction of the transmission line.

9. The magnetic recording device according to claim 6, wherein an impedance value of said output driver is equal to or higher than the characteristic impedance value at a part of said transmission line connected to said connecting part of the output driver.

* * * * *